United States Patent
Austin et al.

(10) Patent No.: US 9,721,617 B2
(45) Date of Patent: Aug. 1, 2017

(54) ADAPTIVE MEDIA CONTENT RECORDING

(71) Applicant: EchoStar Technologies L.L.C., Englewood, CO (US)

(72) Inventors: Jarrod C. Austin, Parker, CO (US); William Joseph Ivanich, Parker, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 14/975,926

(22) Filed: Dec. 21, 2015

(65) Prior Publication Data

US 2017/0178693 A1    Jun. 22, 2017

(51) Int. Cl.
| | |
|---|---|
| H04N 5/94 | (2006.01) |
| G11B 27/36 | (2006.01) |
| G11B 27/034 | (2006.01) |
| H04N 5/76 | (2006.01) |
| H04N 21/433 | (2011.01) |
| H04N 21/44 | (2011.01) |
| H04N 7/015 | (2006.01) |
| H04N 21/462 | (2011.01) |
| H04N 21/442 | (2011.01) |

(52) U.S. Cl.
CPC ............ *G11B 27/36* (2013.01); *G11B 27/034* (2013.01); *H04N 5/7605* (2013.01); *H04N 7/015* (2013.01); *H04N 21/4334* (2013.01); *H04N 21/44016* (2013.01); *H04N 21/44209* (2013.01); *H04N 21/4622* (2013.01)

(58) Field of Classification Search
CPC ................................ G11B 27/36; G11B 27/34
USPC .......................................... 386/263, 278, 291
See application file for complete search history.

(56) References Cited

U.S. PATENT DOCUMENTS

| | | | |
|---|---|---|---|
| 8,799,946 B2* | 8/2014 | Cake ................... | H04N 5/44543 348/569 |
| 2004/0268400 A1* | 12/2004 | Barde ................. | H04N 7/17318 725/94 |
| 2011/0149753 A1* | 6/2011 | Bapst ..................... | H04H 20/22 370/252 |
| 2013/0216207 A1* | 8/2013 | Berry ....................... | H04N 5/76 386/282 |

* cited by examiner

*Primary Examiner* — Thai Tran
*Assistant Examiner* — Mishawn Hunter
(74) *Attorney, Agent, or Firm* — Bejin Bieneman PLC

(57) ABSTRACT

A media content processing system includes a receiver configured to receive a media content signal, associated with a media content instance, from a plurality of sources including a first source and a second source. The media content processing system further includes a processing device programmed to generate a first recorded segment that includes a portion of the media content instance received from the first source, determine a signal strength of the media content signal received from the first source, compare the signal strength to a predetermined level, request the media content signal from the second source if the signal strength is below the predetermined level, generate a second recorded segment that includes a portion of the media content instance received from the second source, and concatenate the second recorded segment to the first recorded segment.

16 Claims, 5 Drawing Sheets

ADAPTIVE MEDIA CONTENT RECORDING

BACKGROUND

Modern televisions can receive various types of input signals. Examples of different types of input signals include antenna signals, cable box signals, DVD player signals, gaming console signals, digital video recorder (DVR) signals, etc. The signals may be received according to different interfaces. High definition signals, for instance, may be received in accordance with a High Definition Multimedia Interface (HDMI) format. Other formats may include Digital Visual Interface (DVI), Composite, S-Video, RCA, and so on. Further, some televisions can communicate over a network such as the Internet. Those televisions can stream media content from a remote server.

DETAILED DESCRIPTION

Figure 1:
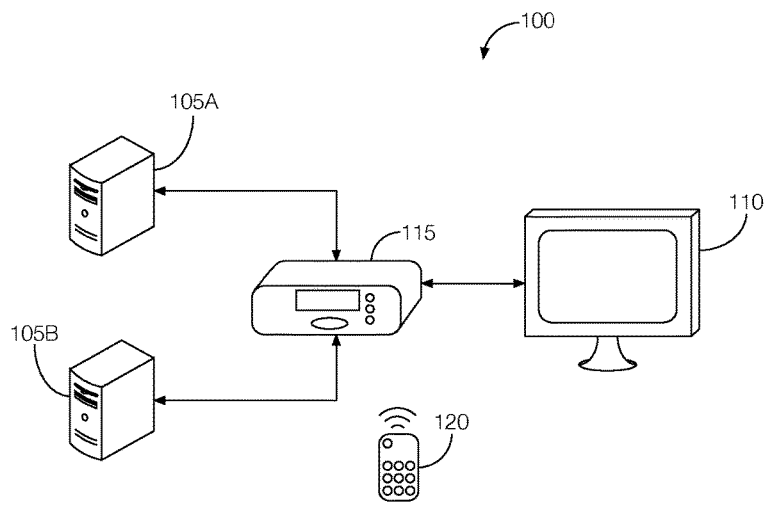
FIG. 1 illustrates an example media processing system with a media content processing device that can receive media content signals from different content sources.

Some media content processing devices allow users to watch and record video from different sources. Some sources may have the same media content but at different qualities. For instance, a media content instance, such as a television show, movie, sporting event, newscast, etc., may be viewed in high-definition (HD) through a channel dedicated to showing HD-quality shows. That same media content instance may also or alternatively be viewed in standard-definition (SD) via a channel dedicated to showing SD-quality shows.

An issue relating to receiving media content from one source may not necessarily affect whether the media content processing device is able to receive the same media content instance from another source. For instance, if an HD channel is experiencing technical difficulties, the media content instance may still be available on the corresponding SD channel. Thus, when watching a live program, the viewer will notice the issue with the HD channel and switch to the SD channel to continue watching the program. This solution, however, only applies when the viewer is watching live television. If the viewer has scheduled a program to record on, e.g., the HD channel, but the HD channel is unavailable at the time of the recording or becomes unavailable during the recording, the media content processing device may fail to record some or all of the program even though the SD version of the program is available on a different channel.

One way to address this issue is with a media content processing system that has a receiver configured to receive a media content signal, associated with a media content instance, from a plurality of sources including a first source and a second source. The media content processing system further includes a processing device programmed to generate a first recorded segment that includes a portion of the media content instance received from the first source, determine a signal strength of the media content signal received from the first source, compare the signal strength to a predetermined level, request the media content signal from the second source if the signal strength is below the predetermined level, generate a second recorded segment that includes a portion of the media content instance received from the second source, and concatenate the second recorded segment to the first recorded segment.

Accordingly, the disclosed media content processing system will begin to record HD-quality media content. If the HD-quality media content becomes unavailable, the media content processing system will begin to record an SD-quality version of the same media content but from a different source. Further, by concatenating the different recorded segments, the viewer will be able to view the entire program, although certain segments may be at different video qualities, by selecting only one file for playback.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

As illustrated in FIG. 1, the media content processing system 100 includes multiple content sources 105, a display device 110, and a media content processing device 115.

The content sources 105 may each include electronic devices programmed to transmit media content to the media content processing device 115. Examples of media content may include video, music, games, internet, digital books, audiobooks, podcasts, etc. The content server may store databases of media content instances. In response to a request for a particular media content instance, the content server may transmit the requested media content instance to one or more media content processing devices 115. In one possible approach, different content sources 105 may provide the same media content instance at different levels of quality. For instance, one content source 105A may provide high-definition (HD) quality media content while another content source 105 may provide standard-definition (SD) quality media content. HD-quality media content may be presented at a higher resolution than SD-quality media content. Accordingly, HD-quality media content may require more bandwidth than SD-quality media content when transmitted to the media content processing device 115.

Although shown as separate content sources 105, the content source 105A and the content source 105B may be controlled by the same media content provider. Examples of media content providers may include a cable television provider, a satellite television provider, an internet provider, a streaming content provider, etc. Further, for purposes of simplicity, only two content sources 105 are shown but many more may be in communication with, and provide media content to, the media content processing device 115.

The display device 110 may include any number of electronic devices that permit the display device 110 to receive media content signals and output an image, and in some instances sound, associated with the received media content signals. Thus, the display device 110 may include one or more interfaces for receiving media content signals, a screen for displaying images, and speakers for outputting sound. Examples, therefore, of display devices 110 may include televisions, computer monitors, laptop screens, tablet computers, mobile phones, etc. Example interfaces incorporated into the display device 110 may include a high-definition multimedia interface (HDMI), a Digital Visual Interface (DVI), a Composite interface, an S-Video interface, an RCA interface, etc. In some possible implementations, the display device 110 may include a wireless interface to facilitate wireless communication with, e.g., the media content processing device 115.

The media content processing device 115 may include any number of electronic devices that allow the media content processing device 115 to receive media content signals from one or more of the content sources 105, process the received signals, and output the processed signals to the display device 110. In one possible approach, the media content processing device 115 may include a set top box. The media content processing system 100 may be further programmed to output other images to the display device 110 such as a program schedule, via a program guide, a recording schedule, various prompts, etc. The media content processing device 115 may further include electronic components that facilitate wireless communication with, e.g., a remote control 120. The remote control 120 may be used by the viewer to transmit various input signals to the media content processing device 115. Examples of input signals that may be transmitted via the remote control 120 and received and processed at the media content processing device 115 may include an on/off command, a channel command based on a series of numbers pressed by the viewer, a response to a prompt presented on the display device 110, a command to record a future showing of a particular media content instance, or the like.

The media content processing device 115 may receive commands from the remote device and take an appropriate action. For instance, in response to a command to record a future showing of a particular media content instance, the media content processing device 115 may update a recording schedule to include the media content instance to be recorded, which may further include, from the program schedule, a channel on which the media content instance will be shown. The channel may be associated with an HD-quality version of the media content instance.

At the time that the media content instance will be shown on the selected channel, the media content processing device 115 may dedicate a tuner to recording the media content instance from the HD channel. The HD channel may be provided by, e.g., the content source 105A. The media content processing device 115 may generate a recorded segment based on the media content instance received from the content source 105A. During the recording, the media content processing device 115 may continually evaluate the quality of the media content signals received from the content source 105A. If the quality drops below a threshold, indicating that the media content processing device 115 is not able to adequately record the media content instance, the media content processing device 115 may be programmed to request the media content instance from a different source, such as the content source 105B. As discussed above, the content source 105B may provide the same media content instance as the content source 105A except at a lower quality, such as SD quality. After it begins to receive the SD quality version of the media content instance, the media content processing device 115 may generate a recorded segment of the media content signal received from the content source 105B. This may continue until the entire media content instance has been recorded. In some instances, however, the media content processing device 115 may determine whether the quality of the HD-quality signal has improved to a sufficient level. If so, the media content processing device 115 may switch back to content source 105A by requesting that the content source 105A provide the media content signal and generating one or more recorded segments with the HD-quality signal. If the quality of the HD signal drops again, the media content processing device 115 may again request the media content instance from the content source 105B, and so on.

To avoid individually storing the recorded segments of the media content instance, which may each represent an incomplete version of the media content instance, the media content processing device 115 may concatenate the segments in the order in which the segments were recorded. This way, the viewer may view the entire media content instance, albeit at different signal qualities, without having to select each segment individually and in the correct order. This way, the recorded media content instance, with the concatenated segments, will appear as a single file when the viewer requests playback of the recorded media content instance.

Moreover, the media content processing device 115 may be programmed to insert a transition image between the segments to prepare the viewer for the change in signal quality. That is, the appearance of the transition image may make the change in quality less jarring to the viewer. In some instances, the transition image may include an overlay applied to one of the segments.

Figure 2:
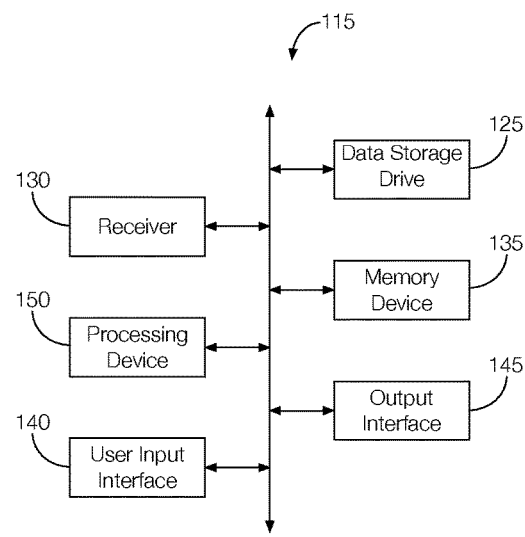
FIG. 2 illustrates example components of the media content processing device.

FIG. 2 illustrates example components of the media content processing device 115. As illustrated, the media content processing device 115 may include a data storage drive 125, a receiver 130, a memory device 135, a user input interface 140, an output interface 145, and a processing device 150.

The data storage drive 125 may include any number of electronic devices, such as a hard disk drive (HDD) or a solid state drive (SSD), configured for persistent data storage. The data storage drive 125 may store one or more recorded media content instances. The media content instances stored on the data storage drive 125 may be accessible for playback on, e.g., the display device 110. For instance, when a media content instance is requested for playback, which may occur when the viewer uses the remote control 120 to provide an appropriate user input, the requested media content instance may be retrieved from the data storage drive 125 and output to the display device 110 via, e.g., the output interface 145.

The receiver 130 may include any number of electronic devices that facilitate signal between the media content processing device 115 and the content sources 105. The receiver 130 may be configured to receive and process signals transmitted from the content sources 105 to the media content processing device 115. The receiver 130, therefore, may include components such as decoders, a demultiplexer, one or more digital signal processors, connectors, etc. The decoders may be configured to decode signals transmitted from the content sources 105. The demultiplexer may be configured to demultiplex the multiplexed signals transmitted from the content sources 105. The digital signal processors may be configured to process the signals received. The connectors may provide a physical interface for receiving the signals. Thus, the connectors may be configured to receive a coaxial cable, an HDMI cable, a DVI cable, Composite cables, an S-video cable, RCA cables, etc.

The memory device 135 may include any number of electronic devices that store data. In some instances, the memory device 135 may be configured to persistently store data such as computer-executable instructions such as firmware. Additionally or in the alternative, the memory device 135 may be configured to store volatile memory. Thus, the memory device 135 may include random-access memory (RAM), read-only memory (ROM), or the like. The data stored in the memory device 135 may be accessible to other components of the media content processing device 115, such as the processing device 150.

The user input interface 140 may include any number of electronic devices that permit the media content processing device 115 to receive user inputs. The user input interface 140 may include, e.g., a wireless receiver 130 for receiving signals transmitted by the remote control 120. If the remote control 120 transmits infrared (IR) signals, the user input interface 140 may include an IR receiver 130. Other types of user input interfaces 140 may include a keyboard, mouse, touchscreen, buttons, etc.

The output interface 145 may include any number of components that facilitate the output of signals to the display device 110. The output interface 145 may include various connectors, such as a coaxial cable, an HDMI cable, a DVI cable, Composite cables, an S-video cable, RCA cables, etc. The output interface 145 may further include a processor or other electronic component that directs the signals to the appropriate connector so that the signals may be output to the display device 110.

The processing device 150 may include any number of electronic devices that can execute computer-executable instructions stored on, e.g., the memory device 135. In some instances, the processing device 150 may be programmed to record media content. That is, the processing device 150 may receive user inputs requesting that a particular media content instance be recorded, determine when that media content instance will be shown, record the media content instance, and store the recorded media content instance on the data storage drive 125. The processing device 150 may perform other operations as well including generating and outputting a program schedule, prompting (via the display device 110) the viewer to make various selections, processing various user inputs received via the user input interface 140, generating an electronic program guide with various menus that allow the viewer to select which content to view, etc.

As it relates to recording media content, the processing device 150 may be programmed to record media content according to any user inputs received. For instance, if the viewer requests, via a user input, that an HD-version of a media content instance be recorded, the processing device 150 may be programmed to record the media content instance from an HD channel. Thus, at the time of the recording, the processing device 150 may request the media content instance from the content source 105A. The processing device 150 may begin to generate a first recorded segment based on the portion of the media content instance, if any, received from the content source 105A.

While recording, the processing device 150 may be programmed to determine the signal strength of the signal received from content source 105A and compare the signal strength to a predetermined level. If the signal strength meets or exceeds the predetermined level, the processing device 150 may be programmed to continue recording the signal transmitted from content source 105A. If the signal strength drops below the predetermined level, however, the processing device 150 may request the media content instance from a different content source 105, such as content source 105, which may present a lower quality version, such as an SD-version, of the media content instance.

While receiving the media content signal, representing a portion of the media content instance, from content source 105B, the processing device 150 may generate a second recorded segment based on that portion of the media content instance. The processing device 150 may be programmed to record the remainder of the media content instance from content source 105B. Alternatively, if the content sources 105 transmit signals of different qualities, the processing device 150 may be programmed to periodically evaluate the signal strength from content source 105A, and begin recording the media content signal from content source 105A if and when the signal strength meets or exceeds the predetermined level.

Moreover, the processing device 150 may be programmed to concatenate the different recorded segments based on the order in which they were recorded. For instance, if the seconded recorded segment is received after the first recorded segment, the processing device 150 may be programmed to concatenate the second recorded segment to the end of the first recorded segment. After concatenating the various segments according to the order in which they were recorded, the processing device 150 may be programmed to store the recorded media content instance, as a single file, in the data storage drive 125.

Further, the processing device 150 may be programmed to insert the transition image between each of the recorded segments. The transition image may include images or text to indicate to the viewer that the content source 105 changed and that some or all of the remainder of the playback of the media content instance may be of a different quality (e.g., a lower resolution). In some instances, the processing device 150 may be programmed to insert the transition image between the recorded segments. In other possible approaches, the transition image may include an overlay, and the processing device 150 may be programmed to apply the overlay so that it appears, e.g., at the end of a recorded segment immediately before a transition, at the beginning of a recorded segment immediately after a transition occurs, or both. The processing device 150 may be programmed to generate the transition image, including the overlay, to have various lengths. For instance, the transition image or overlay may appear for 2 seconds, 5 seconds, 10 seconds, etc.

The processing device 150 may be programmed to select the content source 105 Based on the program schedule, the recording schedule, or both. For instance, if the viewer has expressed a desire, via a user input, to record the media content instance at a high resolution, such as HD-quality, the processing device 150 may determine, from the program schedule, which channel is showing the high resolution version of the media content instance and update the recording schedule to identify the content source 105 for the recording as the channel presenting the high resolution version. Thus, continuing the example above, the processing device 150 may be programmed to identify the content source 105A from the program guide as the channel providing the higher quality version of the media content instance and update the recording schedule to reflect that the media content signal from content source 105A should be recorded.

The processing device 150 may be further programmed to update the recording schedule, the program schedule, or both, should the content source 105A become unavailable before or during the recording of the media content instance. The processing device 150 may be programmed to deem content source 105A as unavailable if the signal strength from content source 105A drops below the predetermined level. By updating the recording schedule, the program schedule, or both, the viewer may avoid the frustration of attempting to view content through content source 105A only to learn that it is unavailable.

Figure 3A:
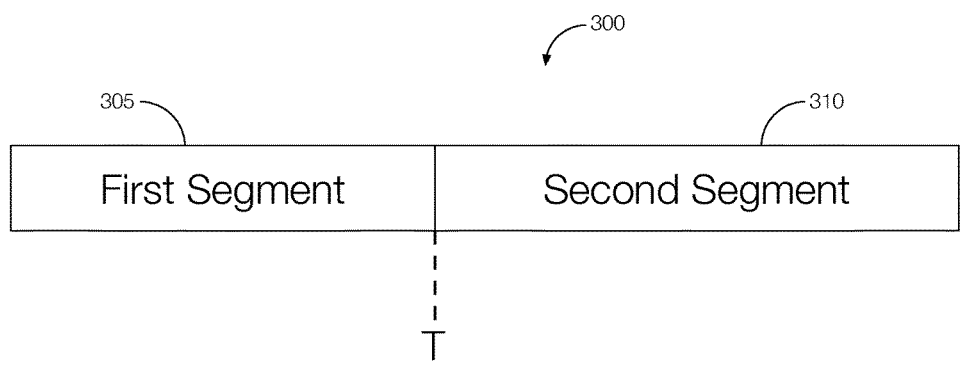
FIGS. 3A-3C illustrate example concatenated recorded segments.
Figure 3B:
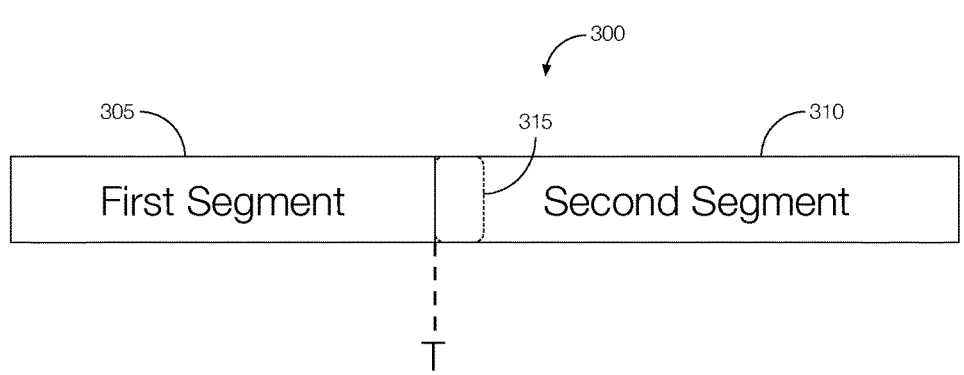
Figure 3C:
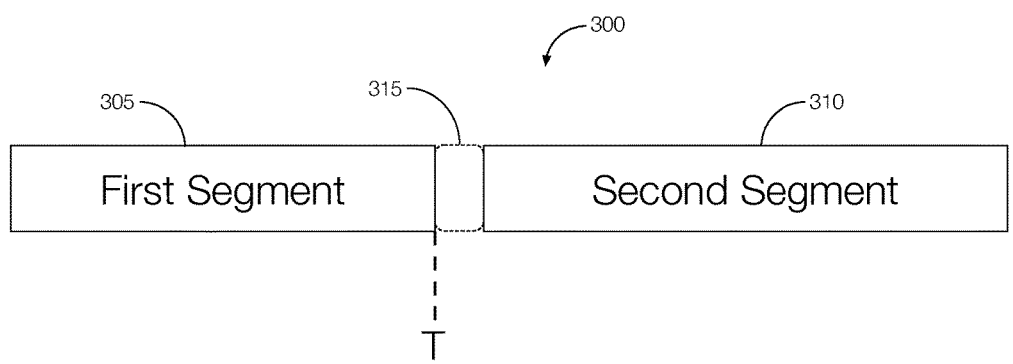

FIGS. 3A-3C illustrate example concatenated recorded segments 300 combined to form a single recorded file. The first segment 305 may be received from the content source 105A. At time T, the processing device 150 may determine that the signal quality from content source 105A is below a predetermined level or is otherwise unavailable or strong enough to adequately record the media content instance from content source 105A. In response, the processing device 150 may request the media content signal from content source 105B. The second segment 310, which may be received from content source 105B, is concatenated to the end of the first segment 305. In FIGS. 3A and 3B, the second segment 310 is concatenated directly to the end of the first segment 305. In FIG. 3B, the transition image 315 includes an overlay applied to the beginning of the second segment 310 and overlaps the second segment 310. Alternatively, the overlay 315 could be applied to the end of the first segment 305 (before time T) and may extend until or after time T. In FIG. 3C, the transition image 315 is concatenated to the first segment 305 between the first segment 305 and the second segment 310. Thus, the transition image 315 may begin at time T and may be presented for a few seconds until the second segment 310 begins.

Figure 4A:
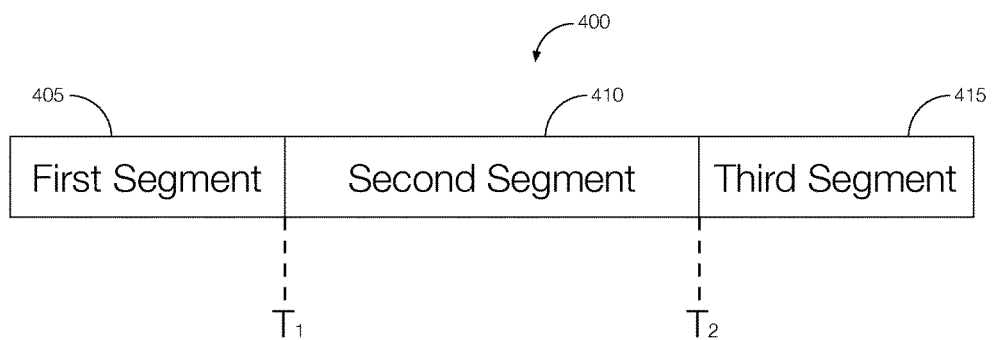
FIGS. 4A-4C illustrate other example concatenated recorded segments.
Figure 4B:
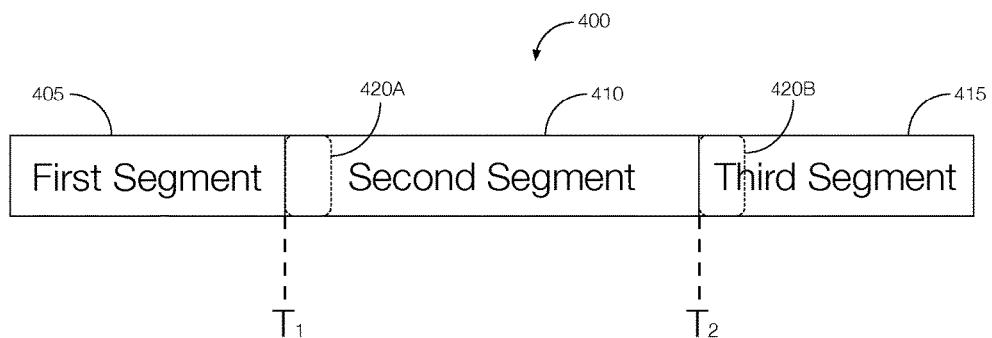
Figure 4C:
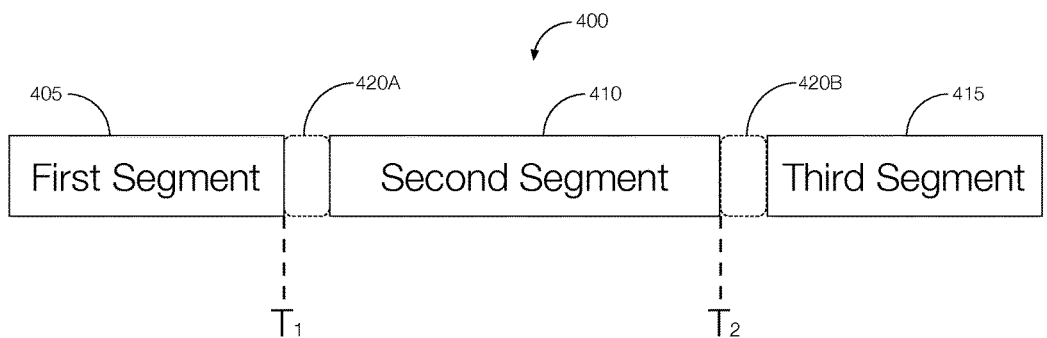

FIGS. 4A-4C illustrate other example concatenated recorded segments 400 combined to form a single recorded file. Similar to the recorded segments 300 shown with respect to FIGS. 3A-3C and discussed above, the recorded segments 400 may include a first recorded segment 405 based on a media content signal received from the content source 105A and a second recorded segment 410 based on a media content signal received from the content source 105B. The media content signal may be received from the content source 105B in response to the signal strength of the media content signal from the content source 105A dropping below the predetermined value, which may occur at time $T_1$. If the signal strength of the media content signal from content source 105A returns to a level above the predetermined level, which is shown at time $T_2$, the processing device 150 may request the content from content source 105A since the media content signal from content source 105A is of a higher resolution than that of content source 105B. The third segment 415, therefore, may represent the portion of the media content instance recorded after returning to the content source 105A. The transition image 420A may include an overlay applied to the first segment 405, the second segment 410, or both, and the transition image 420B may include an overlay applied to the second segment 410, the third segment 415, or both. Alternatively, as shown in FIG. 4C, the transition image 420A may be concatenated to the first segment 405 between the first segment 405 and second segment 410 while the second transition image 420B may be concatenated to the second segment 410 between the second segment 410 and the third segment 415.

Figure 5:
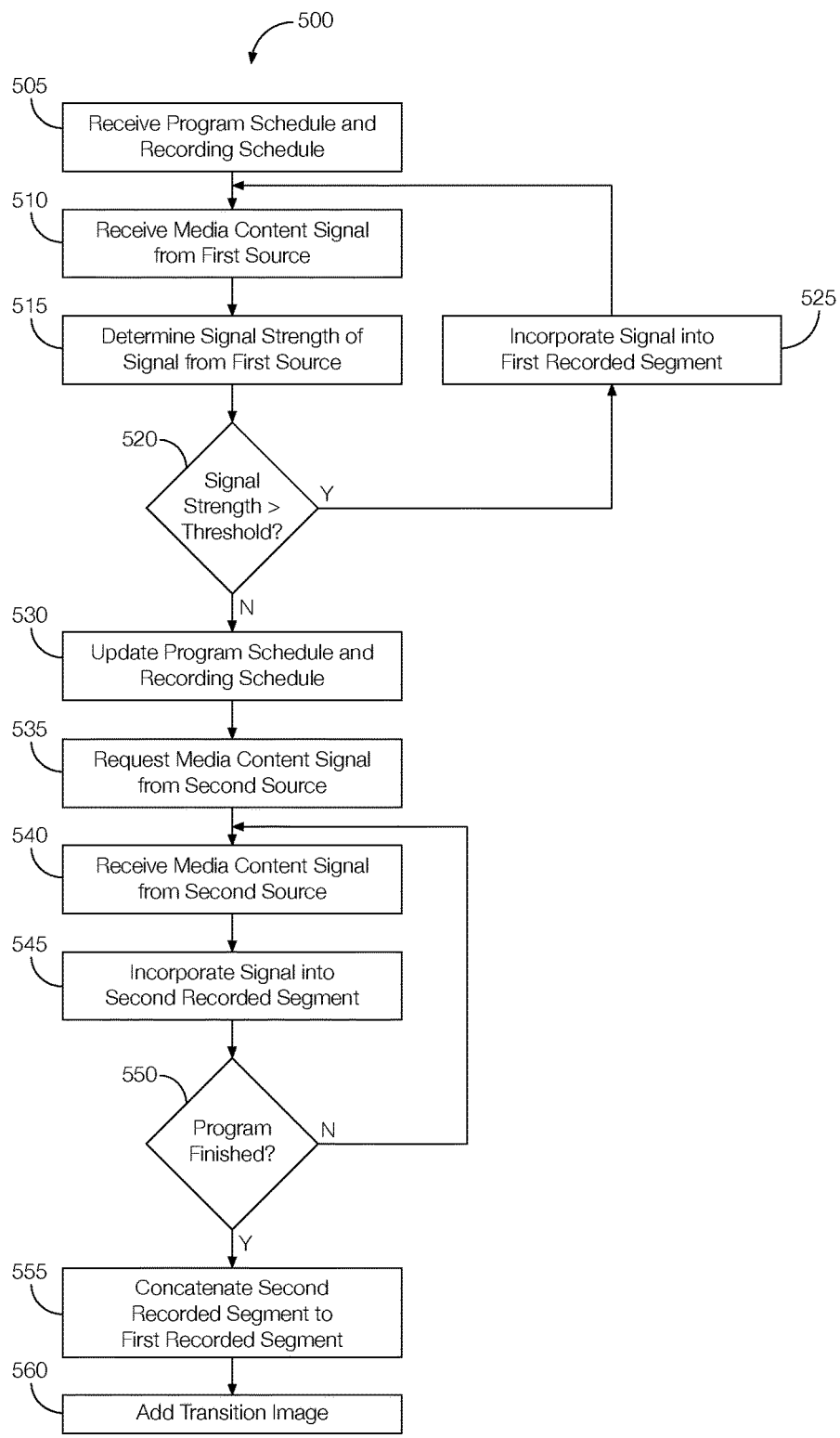
FIG. 5 is a flowchart of an example process that may be executed by the media content processing device for selecting a content source from which to receive a media content signal.

FIG. 5 is a flowchart of an example process 500 that may be executed by the media content processing device 115 for selecting a content source 105 from which to receive a media content signal.

At block 505, the processing device 150 may receive a program schedule and a recording schedule. The recording schedule may identify media content instances that are to be recorded. The recording schedule may identify the content source 105, which may be determined by consulting the program schedule or in response to a user input selecting a particular content source 105 (channel, streaming service, resolution, etc.).

At block 510, the media content processing device 115 may receive the media content signal from the content source 105A. That is, the processing device 150 may request the media content signal from the content source 105 identified in the recording schedule, the program schedule, or in response to the user input. In this example, that content source 105 is content source 105A, which may transmit a high quality version, such as an HD-version, of the media content instance. The media content processing device 115 may receive the media content signal from content source 105A via the receiver 130.

At block 515, the processing device 150 may determine the signal strength of the media content signal received from the content source 105A. For instance, the processing device 150 may be programmed to evaluate signal strength based on, e.g., the amount of power received at the receiver 130. In some instances, the signal strength may be measured. Alternatively, the signal strength may be estimated or inferred from quality of service metrics such as, e.g., bitrate, throughput, latency, transmission delay, jitter, or the like.

At decision block 520, the processing device 150 may compare the signal strength determined at block 515 to a predetermined level. The predetermined level may represent the minimum signal strength needed to present continuous video and audio associated with the media content instance. If the measured or estimated signal strength meets or exceeds the predetermined level, the process 500 may continue to block 525. If the measured or estimated signal strength is below the predetermined level, the process 500 may proceed to block 530.

At block 525, the processing device 150 may incorporate the portion of the media content received so far into the first recorded segment. That is, the processing device 150 may store the portion of the media content signal received from the content source 105A in the data storage drive 125 as a first recorded segment. The process 500 may return to block 510 so that additional segments based on the media content signal received from the content source 105A may be recorded.

At block 530, the processing device 150 may update the program schedule, recording schedule, or both, to indicate that the content source 105A is no longer available and that the media content signal can be recorded from a different content source 105, such as content source 105B. The processing device 150 may update the program schedule to prevent future attempts to record from the content source 105A, at least until the signal strength of the media content signals from content source 105A improves.

At block 535, the processing device 150 may request the media content signal from content source 105B. In one possible approach, requesting the media content signal from content source 105B may include commanding a tuner to tune to a particular channel associated with content source 105B or transmitting a signal to content source 105B identifying the media content instance with a message for content source 105B to transmit the media content instance to the media content processing device 115. As discussed above, the content source 105B may transmit a lower quality version, such as an SD-version, of the media content instance in response to the request.

At block 540, the processing device 150 may receive the media content signal from content source 105B. The media content signal may be received from the content source 105B via, e.g., the receiver 130 and processed so that it may be output to the display device 110 or stored in the data storage drive 125.

At block 545, the processing device 150 incorporate the portion of the media content received from the content source 105B into the second recorded segment. That is, the processing device 150 may store the portion of the media content signal received from the content source 105B in the data storage drive 125 as the second recorded segment.

At decision block 550, the processing device 150 may determine whether the media content instance has finished streaming or airing. If so, the process may proceed to block 555. If the media content instance has not yet finished, the process 500 may return to block 540 so that additional segments based on the media content signal received from the content source 105B may be recorded (e.g., stored in the data storage drive 125).

At block 560, the processing device 150 may concatenate the various recorded segments in accordance with the order in which they were recorded. For instance, the processing device 150 may concatenate the second recorded segment, representing the media content signal received from content source 105B to the end of the first recorded segment, representing the media content signal received from content source 105A. By concatenating the recorded segments, the processing device 150 may create a single file of the recorded media content instance.

At block 565, the processing device 150 may add a transition image to the recorded file. The transition image, as discussed above, may be placed in the recorded file between recorded segments received from different sources. A single recorded file may include multiple transition images, especially if the recorded file includes concatenated segments from multiple content sources 105. Instead of placing the transition image between recorded segments, the transition image may include an overlay applied to the end of one segment, beginning of the next segment, or both (i.e., the overlay bridges both segments).

Figure 6:
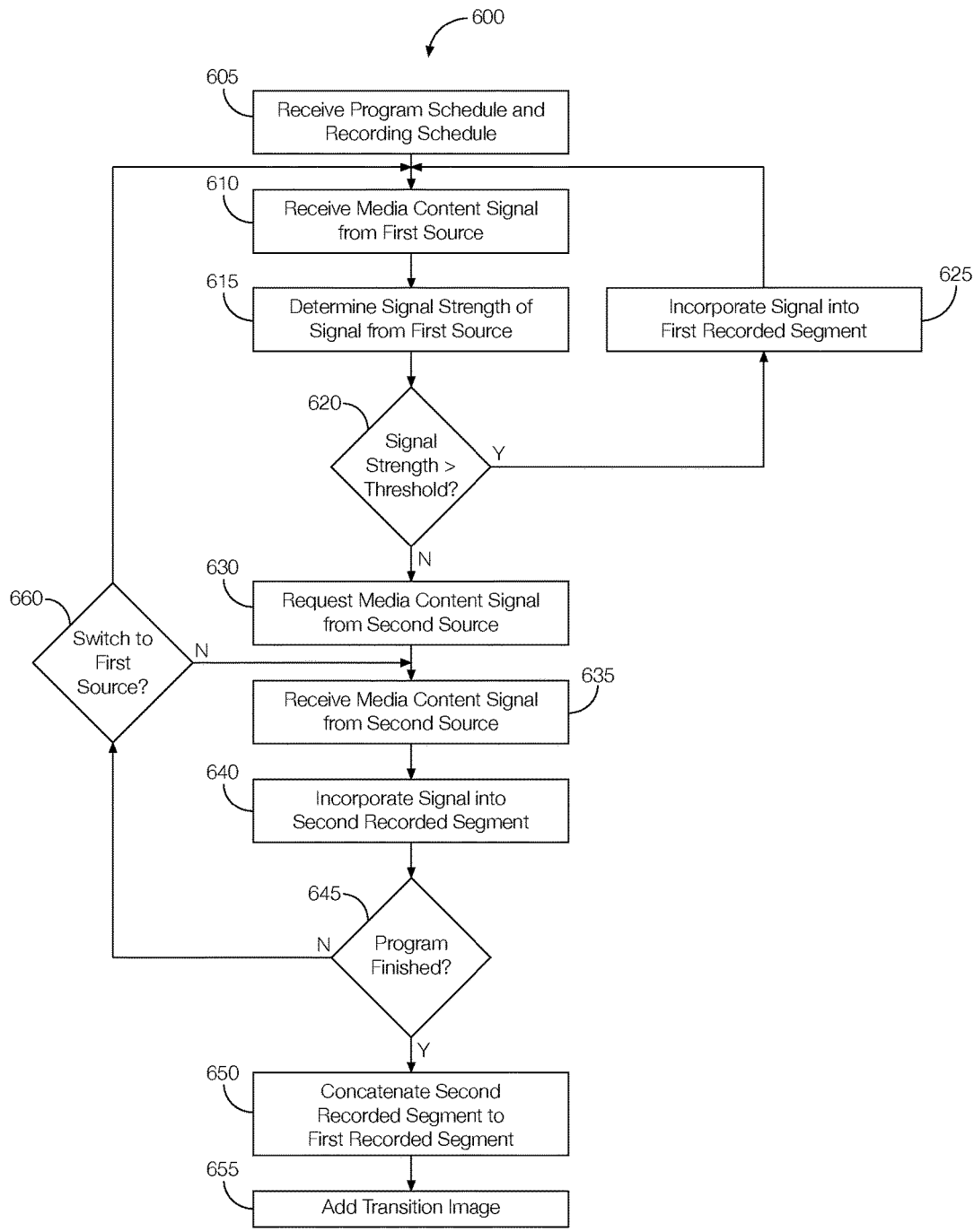
FIG. 6 is a flowchart of another example process that may be executed by the media content processing device for selecting a content source from which to receive a media content signal.

FIG. 6 is a flowchart of another example process 600 that may be executed by the media content processing device 115 for selecting a content source 105 from which to receive a media content signal.

At block 605, the processing device 150 may receive a program schedule and a recording schedule. The recording schedule may identify media content instances that are to be recorded. The recording schedule may identify the content source 105, which may be determined by consulting the program schedule or in response to a user input selecting a particular content source 105 (channel, streaming service, resolution, etc.).

At block 610, the media content processing device 115 may receive the media content signal from the content source 105A. That is, the processing device 150 may request the media content signal from the content source 105 identified in the recording schedule, the program schedule, or in response to the user input. In this example, that content source 105 is content source 105A, which may transmit a high quality version, such as an HD-version, of the media content instance. The media content processing device 115 may receive the media content signal from content source 105A via the receiver 130.

At block 615, the processing device 150 may determine the signal strength of the media content signal received from the content source 105A. For instance, the processing device 150 may be programmed to evaluate signal strength based on, e.g., the amount of power received at the receiver 130. In some instances, the signal strength may be measured. Alternatively, the signal strength may be estimated or inferred from quality of service metrics such as, e.g., bitrate, throughput, latency, transmission delay, jitter, or the like.

At decision block 620, the processing device 150 may compare the signal strength determined at block 615 to a predetermined level. The predetermined level may represent the minimum signal strength needed to present continuous video and audio associated with the media content instance. If the measured or estimated signal strength meets or exceeds the predetermined level, the process 500 may continue to block 625. If the measured or estimated signal strength is below the predetermined level, the process 500 may proceed to block 630.

At block 625, the processing device 150 may incorporate the portion of the media content received so far into the first recorded segment. That is, the processing device 150 may store the portion of the media content signal received from the content source 105A in the data storage drive 125 as a first recorded segment. The process 500 may return to block 610 so that additional segments based on the media content signal received from the content source 105A may be recorded.

At block 630, the processing device 150 may request the media content signal from content source 105B. In one possible approach, requesting the media content signal from content source 105B may include commanding a tuner to tune to a particular channel associated with content source 105B or transmitting a signal to content source 105B identifying the media content instance with a message for content source 105B to transmit the media content instance to the media content processing device 115. As discussed above, the content source 105B may transmit a lower quality version, such as an SD-version, of the media content instance in response to the request.

At block 635, the processing device 150 may receive the media content signal from content source 105B. The media content signal may be received from the content source 105B via, e.g., the receiver 130 and processed so that it may be output to the display device 110 or stored in the data storage drive 125.

At block 640, the processing device 150 incorporate the portion of the media content received from the content source 105B into the second recorded segment. That is, the processing device 150 may store the portion of the media content signal received from the content source 105B in the data storage drive 125 as the second recorded segment.

At decision block 645, the processing device 150 may determine whether the media content instance has finished streaming or airing. If so, the process may proceed to block 650. If the media content instance has not yet finished, the process 500 may proceed to block 660.

At block 650, the processing device 150 may concatenate the various recorded segments in accordance with the order in which they were recorded. For instance, the processing device 150 may concatenate the second recorded segment, representing the media content signal received from content source 105B to the end of the first recorded segment, representing the media content signal received from content source 105A. By concatenating the recorded segments, the processing device 150 may create a single file of the recorded media content instance.

At block 655, the processing device 150 may add a transition image to the recorded file. The transition image, as discussed above, may be placed in the recorded file between recorded segments received from different sources. A single recorded file may include multiple transition images, especially if the recorded file includes concatenated segments from multiple content sources 105. Instead of placing the transition image between recorded segments, the transition image may include an overlay applied to the end of one segment, beginning of the next segment, or both (i.e., the overlay bridges both segments).

At decision block 660, the processing device 150 may determine whether to switch to a different content source 105, which could be content source 105A or another content source 105 transmitting a higher quality version of the media content instance. The processing device 150 may determine the signal strength of content source 105A to determine whether the signal strength is now above the predetermined level. If so, the process 600 may proceed to block 610 so that future recorded segments may be based on the media content signal received from content source 105A. If the signal strength of content source 105A is still below the predetermined level, the process 600 may proceed to block 635 so that additional segments based on the media content signal received from the content source 105B may be recorded (e.g., stored in the data storage drive 125).

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A media content processing system comprising:
a receiver configured to receive a media content signal, associated with a media content instance, from a plurality of content sources including a first source and a second source;
a processing device programmed to generate a first recorded segment that includes a portion of the media content instance received from the first source, determine a signal strength of the media content signal received from the first source, compare the signal strength to a predetermined level, request the media content signal from the second source if the signal strength is below the predetermined level, generate a second recorded segment that includes a portion of the media content instance received from the second source, and concatenate the second recorded segment to the first recorded segment,
wherein the processing device is programmed to receive a program schedule and a recording schedule and request the media content signal from the first source in accordance with the program schedule and the recording schedule identifying the first source and wherein the processing device is programmed to update at least one of the recording schedule and the program schedule to identify the second source in response to detecting the signal strength below the predetermined level.

2. The media content processing system of claim 1, wherein the media content signal received from the first source is associated with a first resolution and wherein the media content signal received from the second source is associated with a second resolution different from the first resolution.

3. The media content processing system of claim 2, wherein the first resolution is greater than the second resolution.

4. The media content processing system of claim 1, wherein concatenating the second recorded segment to the first recorded segment includes combining the first and second recorded segments into a single file.

5. The media content processing system of claim 4, further comprising a data storage drive configured to store the first recorded segment and the second recorded segment as the single file.

6. The media content processing system of claim 1, wherein concatenating the second recorded segment to the first recorded segment includes placing a transition image between the first recorded segment and the second recorded segment.

7. The media content processing system of claim 6, wherein the transition image includes an overlay.

8. The method of claim 1, wherein concatenating the second recorded segment to the first recorded segment includes placing a transition image between the first recorded segment and the second recorded segment.

9. The method of claim 8, wherein the transition image includes an overlay.

10. A method comprising:
receiving a program schedule and a recording schedule;
requesting a media content signal from a first source in accordance with the program schedule and the recording schedule identifying the first source;
receiving the media content signal from the first source;
generating a first recorded segment that includes a portion of the media content instance received from the first source;
determining a signal strength of the media content signal received from the first source;
comparing the signal strength to a predetermined level;
requesting the media content signal from a second source if the signal strength is below the predetermined level;
updating at least one of the recording schedule and the program schedule to identify the second source in response to detecting the signal strength below the predetermined level;
generating a second recorded segment that includes a portion of the media content instance received from the second source; and
concatenating the second recorded segment to the first recorded segment.

11. The method of claim 10, wherein the media content signal received from the first source is associated with a first resolution and wherein the media content signal received from the second source is associated with a second resolution different from the first resolution.

12. The method of claim 11, wherein the first resolution is greater than the second resolution.

13. The method of claim 10, wherein concatenating the second recorded segment to the first recorded segment includes combining the first and second recorded segments into a single file, and further comprising storing the single file in a data storage drive.

14. A media content processing system comprising:
a receiver configured to receive a media content signal, associated with a media content instance, from a plurality of content sources including a first source and a second source according to at least one of a program schedule and a recording schedule;
a processing device programmed to generate a first recorded segment that includes a portion of the media content instance received from the first source, determine a signal strength of the media content signal received from the first source, compare the signal strength to a predetermined level, request the media content signal from the second source if the signal strength is below the predetermined level, generate a second recorded segment that includes a portion of the media content instance received from the second source, and concatenate the second recorded segment to the first recorded segment into a single file,
wherein the media content signal received from the first source is associated with a first resolution and wherein the media content signal received from the second source is associated with a second resolution different from the first resolution, wherein the processing device is programmed to request the media content signal from the first source in accordance with the program schedule and the recording schedule identifying the first source and wherein the processing device is programmed to update at least one of the recording schedule and the program schedule to identify the second source in response to detecting the signal strength below the predetermined level.

15. The media content processing system of claim 14, wherein concatenating the second recorded segment to the first recorded segment includes placing a transition image between the first recorded segment and the second recorded segment.

16. The media content processing system of claim 15, wherein the transition image includes an overlay.

* * * * *